United States Patent [19]

Gmuer et al.

[11] Patent Number: 5,435,189

[45] Date of Patent: Jul. 25, 1995

[54] DEVICE, METHOD AND USE OF THE METHOD FOR DETERMINING A PRODUCTION FLOW

[75] Inventors: Bruno Gmuer, St. Gallen; Peter Naef, Heiden; Roman Weibel, Oberuzwil, all of Switzerland

[73] Assignee: Bühler AG, Uzwil, Switzerland

[21] Appl. No.: 314,274

[22] Filed: Sep. 30, 1994

Related U.S. Application Data

[63] Continuation of Ser. No. 177,208, Jan. 4, 1994, abandoned, which is a continuation of Ser. No. 768,639, Dec. 2, 1991, abandoned.

[30] Foreign Application Priority Data

Feb. 2, 1990 [CH] Switzerland ............. 349/90

[51] Int. Cl.⁶ .............. G01F 01/76; G01G 11/00; G01G 13/06
[52] U.S. Cl. ............... 73/861.37; 222/55; 222/77; 177/17; 177/114
[58] Field of Search ........ 73/223, 861.37, 861, 73/866; 177/17, 114; 222/55, 77

[56] References Cited

U.S. PATENT DOCUMENTS

| | | | |
|---|---|---|---|
| 3,529,139 | 9/1970 | Godwin | 177/17 |
| 4,579,252 | 4/1986 | Wilson et al. | 177/114 |
| 4,667,503 | 5/1987 | Loos | 73/861 |
| 4,809,795 | 3/1989 | Neumann | 177/114 |
| 4,957,176 | 9/1990 | Roth | 177/114 |
| 5,024,352 | 6/1991 | Gmür et al. | 222/55 |
| 5,038,973 | 8/1991 | Gmür | 222/77 |
| 5,121,638 | 6/1992 | Gmür | 73/861 |

FOREIGN PATENT DOCUMENTS

| | | |
|---|---|---|
| 2384246 | 10/1978 | France . |
| 7708128 | 3/1979 | France . |
| 8215136 | 9/1982 | France . |
| 2517087 | 5/1983 | France . |
| 3923653 | 1/1991 | Germany ........... 73/861 |
| 0295833 | 12/1987 | Japan ............. 73/861 |
| 8605874 | 10/1986 | WIPO . |

OTHER PUBLICATIONS

"Gravimetrisch Dosieren–mit Bandwaage oder Differential waage?" 8227 Wagen+Dosieren, Nov. 1989, Mainz, Germany; Ralf M. Urban, pp. 241–245 (No translation).

"Weighing and Dosing" Ralf M. Urban, Nov. 20, 1989, No. 6 pp. 241–245.

*Primary Examiner*—Richard E. Chilcot, Jr.
*Assistant Examiner*—George M. Dombroske
*Attorney, Agent, or Firm*—Finnegan, Henderson, Farabow, Garrett & Dunner

[57] ABSTRACT

A new device and method for measuring large production flows of e.g., one to fifty tons per hour with products such as mill products having unfavorable flow behavior. The production flow is directed intermittently into an upright weighing container for a brief time and is compulsorily discharged from the latter substantially horizontally so as to be controlled with respect to speed. The production flow is periodically monitored volumetrically and gravimetrically by means of differential weighing.

The use of the method suggests that the production flow in a mill be measured by means of differential weighing for the purpose of controlling, e.g., monitoring the work process prior to wetting, e.g. as mill input capacity, e.g. for monitoring in the milling process, e.g. for the flour weigher.

13 Claims, 4 Drawing Sheets

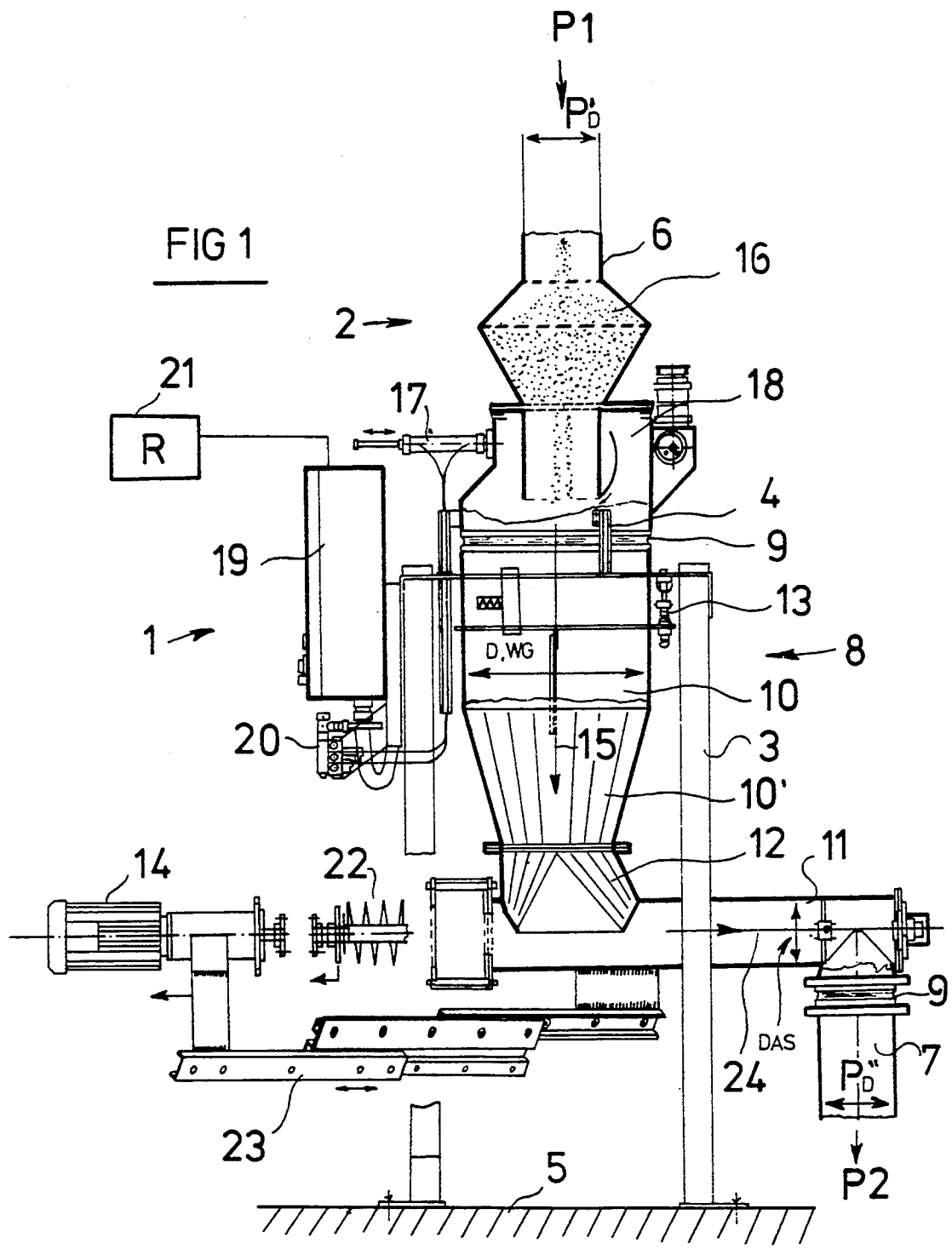

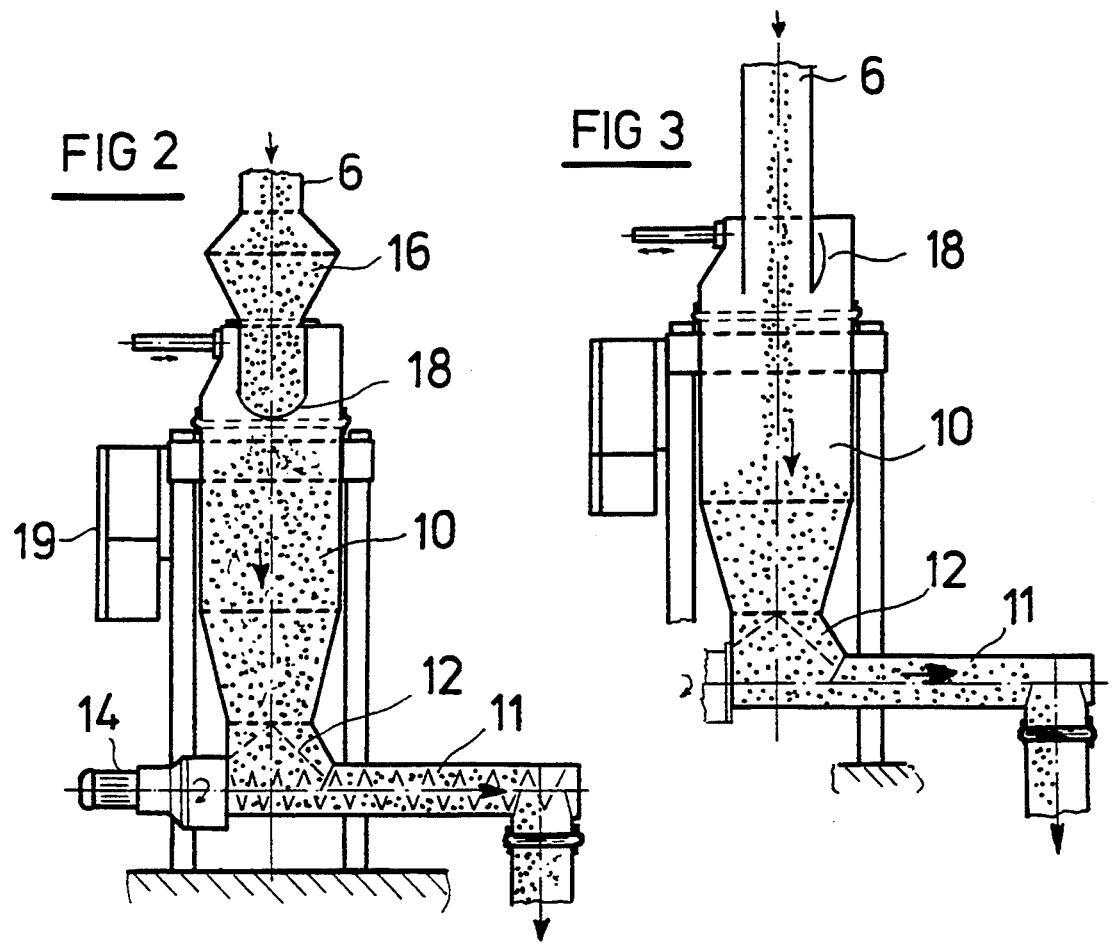
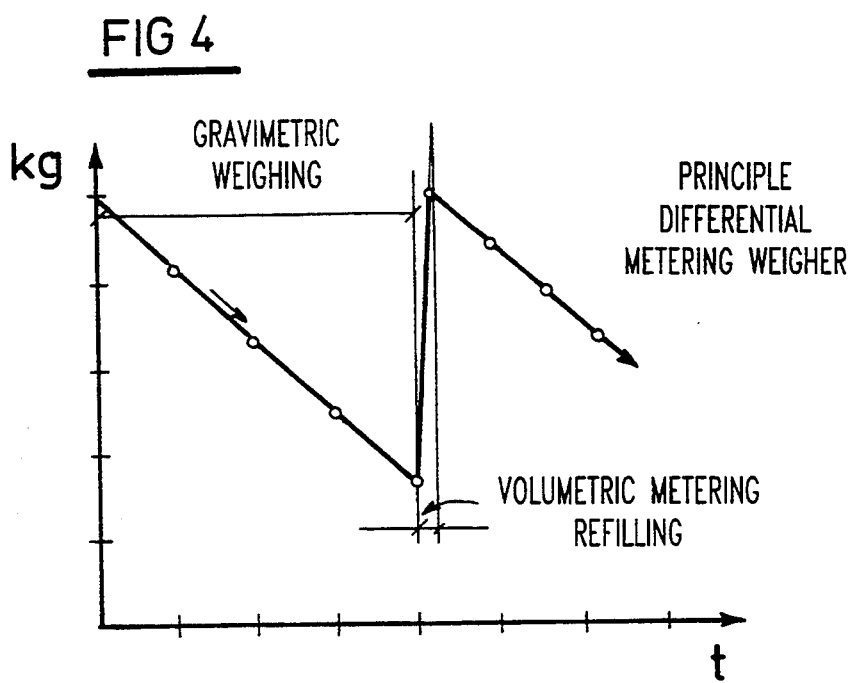

DEVICE, METHOD AND USE OF THE METHOD FOR DETERMINING A PRODUCTION FLOW

This application is a continuation, of application Ser. No. 08/177,208 filed Jan. 4, 1994, now abandoned, which is a continuation of prior application Ser. No. 07/768,639, filed Dec. 2, 1991, now abandoned.

TECHNICAL FIELD

The invention is directed to a device as well as a method for determining a production flow with products having unfavorable flow behavior, e.g. in a mill.

BACKGROUND ART

In production plants which already have a high degree of automation, e.g. mills as well as feedstuff mills, a conflict of goals has recently developed in that an inexpensive increase in quantity is impossible with existing technical measuring means or is possible only at the cost of qualitative parameters. Increasingly higher installed throughput capacities with persistently strict demands on quality, particularly on the consistency of the quality, require a more precise controlling and monitoring of the production flows. Both the processing quantity and the instantaneous throughput must be constantly determined with weighing precision.

However, accurate weighing involves repeated filling of the weigher, measurement and emptying of the weigher, insofar as accurate weighing is understood to mean weighing by means of weighers which are calibrated by government technicians, and results in an intermittent transporting of the product. In order to overcome this disadvantage, intermediate compensating bins must be used in addition, but this necessitates additional costs. At present, belt weighers are used almost exclusively for continuously determining a production flow with respect to quantity with materials having unfavorable flowing properties, e.g. flour, flour mixtures, break, bran, etc., and for a continuous transporting of the product. Belt weighers have the great advantage that the problems of flow behavior of the product to be weighed have virtually no influence. The product is continuously guided on the weighing belt, weighed and discharged, likewise in a continuous manner. But this solution is disadvantageous in two respects. A belt weigher is less accurate than a classic hopper scale. While the latter works easily within a tolerance of $+/-1$ to $2\%$, this value ranges from $+/-2\%$ to $1\%$ in belt weighers. The other disadvantageous aspect consists in the cost for belt weighers and particularly in the operating expense for maintenance, cleaning, servicing, etc. Belt weighers are expensive and can only be successful in the processing of very highly priced products such as chemical substances. Not many belt weighers are found in foodstuff and feedstuff plants for the aforementioned reasons, but also because belt weighers require relatively large horizontal dimensions. In past years, great efforts have also been made to monitor the product flow with entirely different measuring systems, but without greater success.

Another special problem consists in the throughput capacity, which regularly amounts to well over one ton per hour in present-day milling operations; the usual amounts are 10 ... 20 ... 50 or more tons per hour for the respective production flows to be measured.

OBJECT AND SUMMARY OF THE INVENTION

A primary object of the invention is to develop a new measuring system for the measurement of a large product flow, also, which measures the throughput with weighing precision, allows a completely continuous product transfer as in belt weighers and operates without disturbance and in an accurately weighing manner particularly for product with heavy flow properties.

The solution, according to the invention, is characterized in that it comprises an upright weighing container, a variable-speed discharge screw with a substantially horizontally directed discharge at the weighing container, as well as a transition piece from the weighing container to the discharge screw and differential weighing elements.

The basic idea of the invention consists in the use of an upright weighing container, from which the product is positively discharged by a controllable discharge screw. The weight can be determined continuously in a manner known per se by an upright weighing container by means of differential weighing. The substantially horizontal discharge does not influence the vertical weight signals. Accordingly, a production flow can be measured with weighing precision with the concept of differential weighing and can be constantly monitored with a variable-speed discharge screw and a completely continuous transfer of the product is guaranteed in this way. A natural, constant product flow results from the consistent filling of a weighing container, particularly a tubular weighing container (tube weigher) and a transition piece from the upright weighing container to the horizontal discharge screw, all three of which together form a type of knee piece, wherein the weighing container works like a build-up space which empties continuously by means of the force of gravity and only the horizontal discharge is effected in a compulsory manner by mechanical means. In a preferred manner, the upright weighing container, the transition piece, the discharge screw which discharges on one side, and the controllable drive motor which operates on the opposite side form a weighing unit and this weighing unit can be suspended, for example, at three bending rods.

The transition piece from the weighing container to the discharge screw preferably remains constant in cross section, at least approximately, wherein in the case of a circular cross section of the weighing container, the shape of the transition piece passes from circular to rectangular. A positive, uniform product flow having a very great degree of consistency as a result of a corresponding programming of a weigher control unit accompanied by controllable feed accordingly results within the entire weighing unit. When the feed cannot be influenced, the product discharge even has a greater uniformity than the feed if fluctuations of the feed are only brief. An exact measurement is effected in this way; the production flow remains constant or can even be calmed. Further, it is possible to let the weighing system idle prior to every interruption or for a change of product. In addition, the entire weighing unit can be suspended and/or supported on a platform construction. When particularly strict demands are made with respect to purity, a travel-out rail can be arranged in the lower area of the weighing unit and the discharge screw with the drive motor can move out on this travel-out rail for cleaning purposes.

In all cases of application in which the feed cannot be switched off, it is suggested that a build-up bin with a controllable base flap be arranged above the tube weigher. The preliminary bin will preferably comprise 30% to 90% of the capacity of the tube weigher, wherein a cycle time can be in the range of several seconds to thirty seconds.

The invention is further directed to a method and is characterized in that the production flow is temporarily directed into an upright differential weighing container intermittently, the product being discharged from the latter continuously in a substantially horizontal direction by means of a variable-speed discharge screw. The differential weighing time preferably amounts to approximately one to five times more than the refilling time.

Surprisingly, the very valuable concept of differential weighing has accordingly been successfully transferred from metering technology to production monitoring contrary to prejudices of technical circles. Although it was previously assumed that the differential measuring system loses much of its appeal with large outputs. Various reasons have been cited for this: large outputs call for extensive hoppers and containers in order to reduce the refilling time in that the metering means is compelled to work in a volumetric manner in each instance. Problems relating to space can then also occur with the refilling device. In fact, the space requirement is much more critical for differential metering means with great output than is the case in belt metering devices. It can be assumed as a general rule that a differential metering means should not work in a volumetric manner for more than 1% of the operating time, i.e. the refilling device would have to have enormous dimensions at high outputs.

Finally, in addition, the accuracy of a differential metering means has been placed in doubt when the throughput exceeds one to two tons per hour.

With the new invention, the product can be delivered in a continuous manner to the next processing stage after exact weighing with minimum time delays of seconds. The results are even more accurate because a very short cycle time is used in a very deliberate manner and the evaluation is calculated by means of statistical methods.

In a further development of the inventive idea, differential weight values are measured in the weighing container when the feed has stopped and the corresponding speeds of the discharge screw are determined for the calculation of the instantaneous discharge quantity per time unit and/or a summed throughput of the production flow over an allowed time period.

But the particular advantage consists in that the product always remains in movement in the weighing container from which material is constantly removed, and most products with heavy flow properties, such as occur in a milling operation for foodstuff or feedstuff, can accordingly be determined with respect to throughput with the new solution. In the normal operating state, no product stoppage occurs in the weigher, so that the problem of monitoring the calming friction into the movement friction within the weighing container can be avoided. Depending on the application, the feed can be stopped by means of controlling the feed or by means of forming a small preliminary bin. In the preliminary bin, which can be locked e.g. via controllable base flaps, a temporary build-up of the product for several seconds is taken into account. However, since the preliminary bin is not a weighing part, simple mechanical movement means can easily be used in this instance, if necessary, for supporting the discharge without disturbing the measuring accuracy, but nevertheless preventing a stoppage at the location.

The throughput of the production flow can be measured based on the continuous volumetric discharge from the weighing container with a cyclical correction of the volumetric value by means of the differential weighing weight value. In a particularly preferred manner, the ratio of throughput to speed of a metering discharge screw or lock determined by the differential weighing is determined, stored and predetermined for subsequent presetting of a volumetric metering output of a like or similar product.

If the production flow has greater fluctuations which cannot be influenced directly, per se, or if the production flow is known only within larger limiting values, one or more filling cycles of constant duration are advantageously predetermined over a selectable first time interval, wherein the differential weighing begins with a delay of constant duration and the product is discharged with predetermined volumetric reference values during the first time interval.

It is advantageous if the filling cycle time for a following time interval is changed due to the weight differences at the beginning of the respective differential weighing. It is particularly preferred that the production flows be measured by means of differential weighing before and after milling in a mill, which values are used for determining the yield and determining other parameters for controlling the mill.

However, the new invention also makes it possible for the first time, in the case of a continuously slightly fluctuating production flow resulting from the processing process, to accurately measure the weight of this production flow in a continuous manner and to mix other components into the continuous production flow, e.g. different specific flour into a main flour in order to change the quality of the main flour. This is effected in that a master weigher is provided for mixing two or more product flows and each additional differential weigher begins cyclically with the master weigher with predetermined speed reference values, and the regulating of the metering output of each additional differential weigher is effected corresponding to the actual value of the measured weight values of the master weigher.

It is very advantageous if the new invention is used in such a way that the production flow in a mill is determined via a cyclical, volumetric-gravimetric measurement for the control and/or monitoring of the working process prior to wetting and/or as mill input capacity and/or for monitoring in the milling process and/or for the flour weigher.

For a better understanding of the present invention, reference is made to the following description and accompanying drawings while the scope of the invention will be pointed out in the appended claims.

BRIEF DESCRIPTION OF THE DRAWINGS

FIG. 1 shows a flow measuring device, according to the invention;

FIG. 2 shows the measuring device of FIG. 1 during the differential weighing phase;

FIG. 3 shows an analogous measuring device during the volumetric discharge phase;

FIG. 4 shows a classic diagram of differential metering weighing;

DESCRIPTION OF THE PREFERRED EMBODIMENTS

Figure 5:
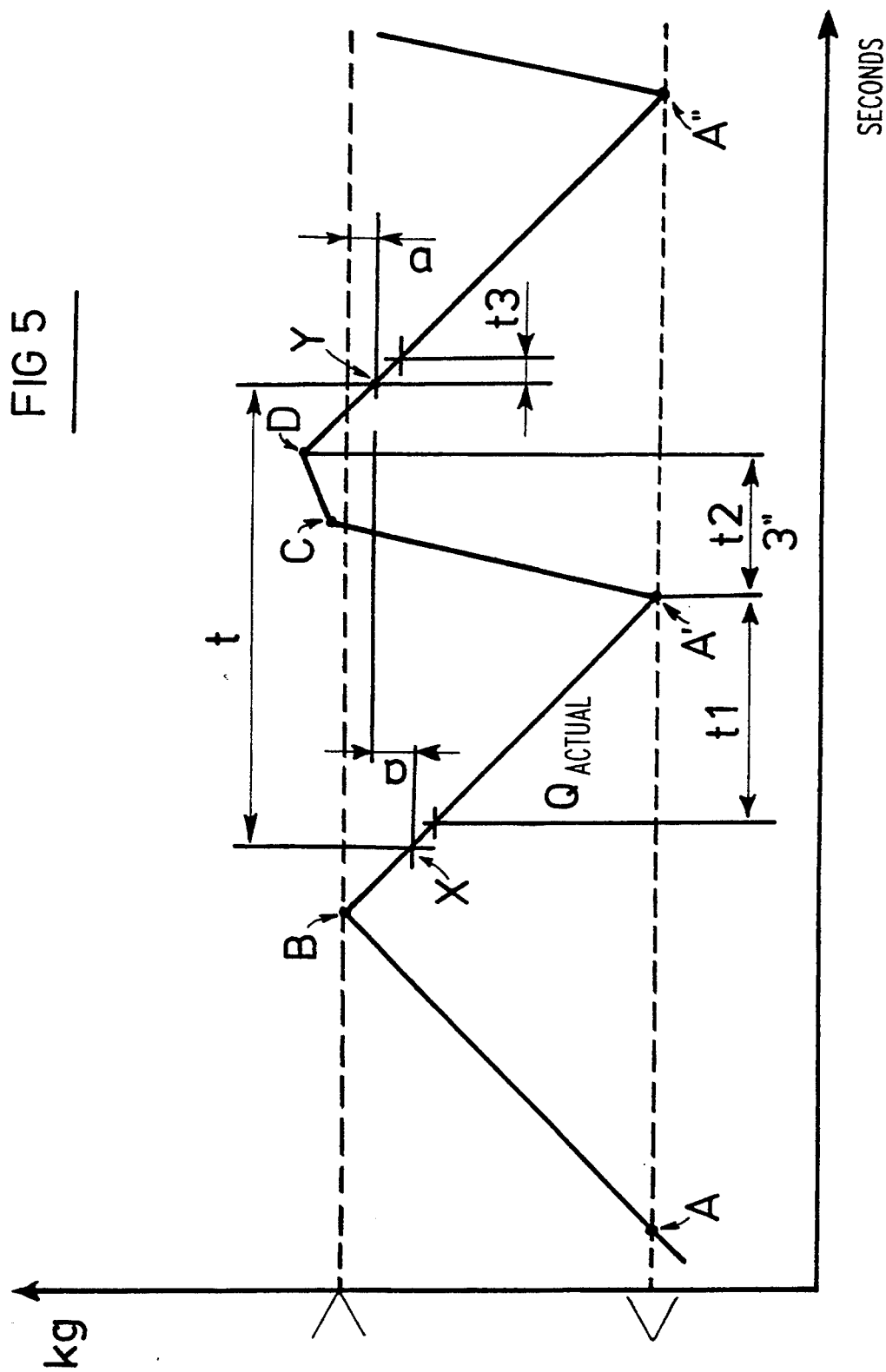
FIG. 5 shows the curve of the weight indication in the weighing container over time.

Reference is made to FIG. 1 in the following. The production flow P1 enters vertically into a flow measuring device 1 at the top and leaves the latter again at the bottom as P2. The flow measuring device comprises a feed head 2 which is securely connected with a platform 3 via brackets 4 and is supported on the base 5. A feed tube 6 and a diverting tube 7 are stationary. The weighing part 8 is connected to the feed head 2 and the diverting tube 7 via a flexible rubber sleeve 9 in each instance so as to be tight against dust relative to them. The weighing part 8 comprises an upright weighing container 10 whose lower part comprises a slight conically tapered portion 10'. The weighing container 10 and the conically tapered portion are constructed as a circular tube shape. A transition piece 12 is arranged between the weighing container 10 and a discharge screw 11 and ensures the transition from the upright tubular shape of the weighing container 10 into a horizontal tubular shape of the discharge screw 11 in an optimal manner with respect to production flow technology. In FIG. 1, the transition piece 12 has an approximately constant cross section from top to bottom and has a shape passing from circular to rectangular in the embodiment example. The weighing part 8 is suspended in the circumferential direction at e.g. three weight measurement value receivers 13 at the platform 3. Especially interesting is the suspension of the entire weighing part 8, including a drive motor 14, so that the drive motor 14 and the discharge screw 11 project out over the weighing part 8 in opposite directions and balance one another within a certain circumference with respect to a center axis 15. A preliminary bin 16 is situated directly at the feed tube 6, which preliminary bin 16 is controllable by a pneumatic cylinder 17 and a base flap 18 via an electronic control unit 19 or a pneumatic signal transformer 20, respectively, according to a selectable program, wherein reference values for the product discharge are obtained by an external computer 21 and the actual value weight signals are obtained by the weight measurement value receivers 13.

The preliminary bin comprises preferably approximately 30% to 90% of the maximum volumetric capacity of the weighing container 10. However, a course is accordingly taken in this instance in a very deliberate manner which diverges from the conventional use of a differential weigher, since only a portion can be pre-stored for the filling of the weighing container, so that the feed can likewise be determined with weighing technology, which is important for determining a production flow if additional regulating devices are not taken into account for the feed.

The height of the weighing container is approximately twice its diameter, wherein the diameter can amount to 0.3 to 0.6 m. For this purpose, the tube screw conveyor has a diameter of 0.100 to 0.250 m, so that the average ratio of the weighing container cross section to the tube screw conveyor is approximately 1:10.

A further particularly interesting construction idea is shown in FIG. 1 in that the drive motor 14, with or without flanged on discharge screw shaft 22, can be pulled out in the direction of the axis 24 of the discharge screw 11 in the manner of a drawer via pull-out means 23. This makes it possible to service the device quickly at any time while imposing particularly strict demands on the device with respect to the cleanliness of the product path of the production flow.

As the product falls in the upright weighing container 10 constantly in the vertical direction, it is guided directly into the front feed of the discharge screw shaft 22, discharged horizontally from the weighing container 10, and delivered in turn in a continuous manner vertically via the diverting tube 7 so as to be monitored once again with the use of technical measuring means.

FIG. 2 shows the same device as in FIG. 1 during the gravimetric weighing phase with closed base flap 18. Differential weighing takes place in this instance during the production discharge, or the constantly discharged product is measured by means of the corresponding reduction of weight in the weighing container 10.

FIG. 3 shows an arrangement similar to that in FIG. 2, but without a preliminary container. The phase of volumetric discharge metering takes place here. FIG. 4 shows the classic curve, known per se, of a differential metering weigher. The latter is characterized by an extremely short filling time and a very long gravimetric weighing, which is ultimately the purpose of differential metering.

FIG. 5, which shows two weighing cycles, according to the new invention, is referred to in the following. A is the beginning of the filling of a differential weigher with a more or less regular product feed. At B, the product feed is stopped and the product discharge from the weigher begins simultaneously with differential weighing, which consists particularly in that the weight which is reduced per unit of time is determined at the weigher which is no longer disturbed by the feed. Point A' is the end of the differential weighing. The product which has built up in the feed area from B to A' is left in the differential weigher until point C. A regular product feed is effected briefly until the product guidance is interrupted again at point D. The second differential weighing is performed from D to A'.

In the following two cases:
 change in the discharge quantity from the differential weigher when the feed quantity cannot be influenced or
 change in the feed quantity at desired discharge reference value, it is important with respect to regulation that a constant time (cycle time) be selected for at least two weighing cycles. As a result, there is a difference between the feed weigher and the metering output which must be influenced.

$t1$ = gravimetric weighing time
$t2$ = refilling time
$t3$ = time for regulating
$t$ = cycle time The regulating can be effected according to the following equation:

$$Q_{reference} \text{ (kg/sec)} = Q_{actual} + \frac{Y - (a)}{t} + 0.5 \frac{Y -> (b)}{t}$$

Figure 6:
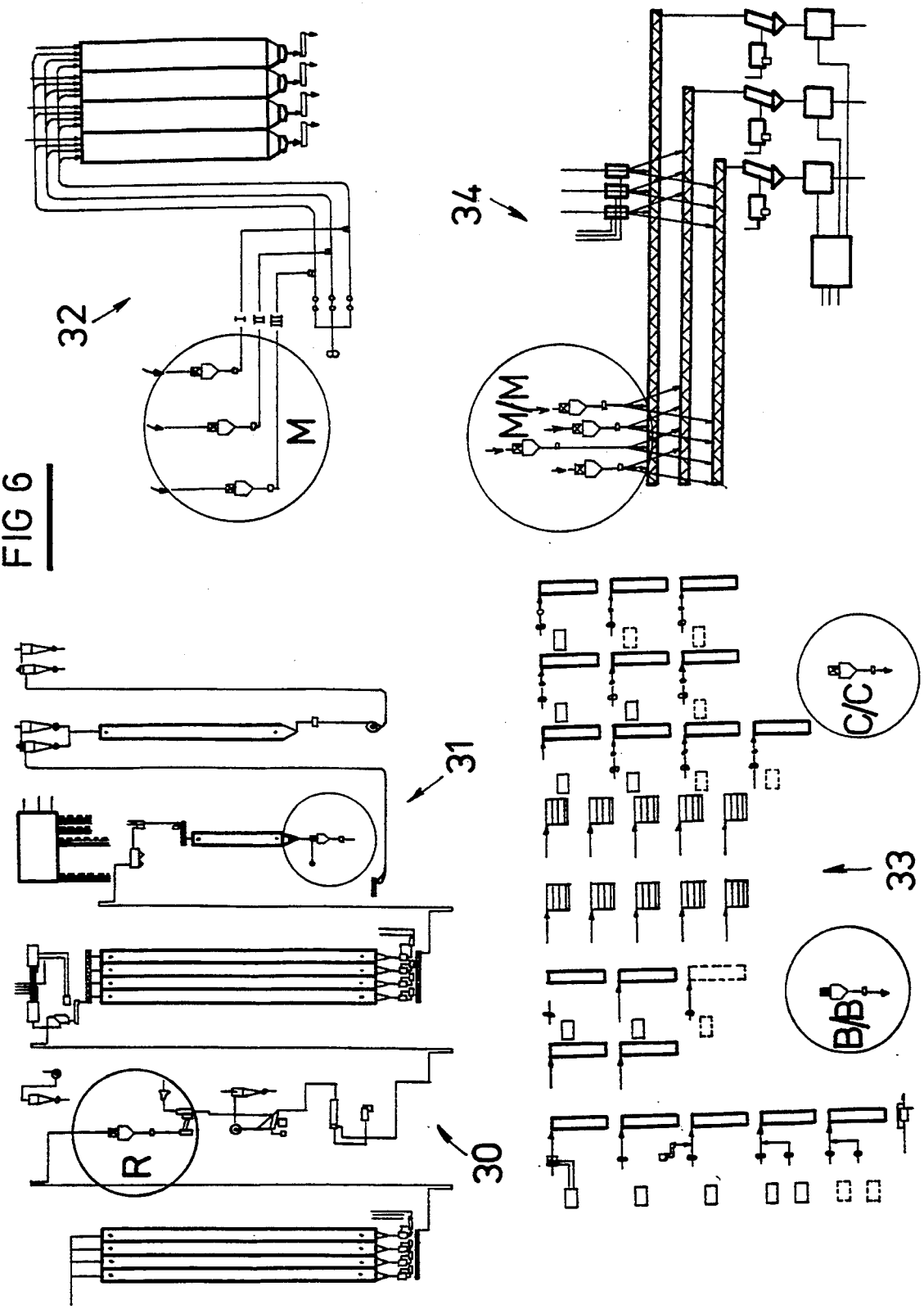
FIG. 6 shows uses of the new invention in a milling diagram.

An entire mill is shown schematically in FIG. 6. This concerns a mill cleaning 30, tempering and milling preparation 31 as upper left-hand block. At the top right-hand corner is a flour silo 32, the mill 33 with plansifters and semolina cleaning machines is at the bottom left-hand corner, and a flour mixing 34 is indicated at the lower right-hand corner. The use of the new invention is marked by a circle in the diagram. A control passage, e.g. the ratio of sieve tailings to sieve throughs after B1 is designated by B and a corresponding key passage at the reduction passages for a continuous monitoring of the production flow is designated by C.

While the foregoing description and drawings represent the preferred embodiments of the present invention, it will be obvious to those skilled in the art that various changes and modifications may be made therein without departing from the true spirit and scope of the present invention.

What is claimed is:

1. A device for determining a product flow of products having unfavorable flow properties comprising:
    an upright weighing container;
    a closeable preliminary bin for the weighing container;
    a discharge metering screw with controllable rotational speed being fixedly connected with a lower portion of the weighing container, said discharge metering screw having an essentially horizontally arranged discharge;
    a transition piece from the weighing container and discharge metering screw; and
    differential weighing elements arranged relative to said weighing container, wherein the container has a tubular exit and said transition piece has a round cross section at its inlet side for coupling to said tubular exit and a rectangular cross section at its outlet side for coupling to the horizontal metering discharge screw, the rectangular cross section and round cross section having areas of similar size.

2. A device for determining a product flow of products having unfavorable flow properties comprising:
    an upright weighing container;
    a closeable preliminary bin for the weighing container;
    a discharge metering screw with controllable rotational speed being fixedly connected with a lower portion of the weighing container, said discharge metering screw having an essentially horizontally arranged discharge;
    a transition piece from the weighing container and discharge metering screw; and
    differential weighing elements arranged relative to said weighing container wherein the discharge screw has an axis and is arranged to be removable in the direction of the axis in the manner of a drawer.

3. An apparatus for determining a product flow of products having unfavorable flow properties comprising:
    a weighing container, the weighing container having a tubular exit;
    a discharge device including a housing and a metering screw with controllable rotational speed, the discharge device housing being disposed beneath the weighing container exit, said discharge device housing being essentially horizontally arranged;
    a transition piece extending between the weighing container and discharge device housing, the transition piece having a round cross section at its inlet side for coupling to said tubular exit and a rectangular cross section at its outlet side for coupling to the discharge device housing, the rectangular cross section and round cross section having areas of similar size.

4. An apparatus for determining a product flow of products having unfavorable flow properties comprising:
    a weighing container;
    a discharge device including a housing fixedly connected with a lower portion of the weighing container and having a horizontal axis and a metering screw with controllable rotational speed being disposed in the housing along the horizontal axis, the discharge metering screw being removable in the direction of the horizontal axis in the manner of a drawer.

5. The apparatus of claim 4 wherein the discharge device includes a drive motor assembly operatively connected to drive and support the metering screw, and wherein the apparatus further includes a telescoping assembly interconnecting the drive motor and the discharge device housing.

6. An apparatus for determining a product flow of products having unfavorable flow properties comprising:
    a differential weighing container having a tubular exit;
    a transition piece fixedly attached to the container at the tubular exit, the transition piece having a round cross-sectional inlet and a rectangular cross-sectional exit; and
    a discharge device fixedly attached to the rectangular exit of the transition piece, said discharge device having an essentially horizontally arranged metering screw, wherein the metering screw is removable in the manner of a drawer.

7. The apparatus of claim 6 further including a bin for holding a predetermined amount of product and positioned to discharge the held product into the differential weighing container, wherein the predetermined amount is 30 to 90% of the capacity of the differential weighing container.

8. The apparatus of claim 6 wherein the ratio of the height to the diameter of the differential weighing container is approximately 2 to 1.

9. The apparatus of claim 6 wherein the ratio of the cross section of the differential weighing container to the cross section of the discharge device is approximately 10 to 1.

10. An apparatus for determining a product flow of products having unfavorable flow properties comprising:
    a differential weighing container; and
    an essentially horizontally oriented discharge device fixedly interconnected to the differential weigher, said discharge device having a metering screw with a drive motor assembly and a housing with an opening therein at a distal screw end, wherein at least portions of the drive motor assembly and housing extend beyond opposite sides of the container to maintain an equilibrium about a horizontal axis through the center of the container.

11. The apparatus of claim 10 wherein the differential weigher and discharge device are interconnected by a transition piece, and the transition piece has a round cross-sectional inlet and a rectangular cross-sectional exit.

12. The apparatus of claim 11 wherein the area of the inlet and exit are approximately equal.

13. A method for determining the instantaneous discharge amount per unit time and/or a summed throughput of a product flow of products having unfavorable flow properties in a production installation, the method using an apparatus including a differential weigher and a discharge device, the method comprising the steps of:

directing the product flow during intermittent filling intervals of a few seconds duration into the differential weigher, wherein a cycle time between successive fillings is less than 30 seconds;

discharging the product continuously and substantially horizontally from the differential weigher using the discharge device; and measuring the discharged product flow during weighing intervals occurring between the filling intervals, the measuring of product flow being correlated with rotational speed of the discharge screw.

* * * * *